US009441702B2

(12) United States Patent
Saito et al.

(10) Patent No.: US 9,441,702 B2
(45) Date of Patent: Sep. 13, 2016

(54) MAGNETORHEOLOGICAL FLUID DAMPER

(71) Applicant: KAYABA INDUSTRY CO., LTD., Tokyo (JP)

(72) Inventors: Keiji Saito, Tokyo (JP); Kazuhisa Nakamura, Kanagawa (JP)

(73) Assignee: KYB CORPORATION, Tokyo (JP)

( * ) Notice: Subject to any disclaimer, the term of this patent is extended or adjusted under 35 U.S.C. 154(b) by 0 days.

(21) Appl. No.: 14/406,537

(22) PCT Filed: Jul. 23, 2013

(86) PCT No.: PCT/JP2013/069861
§ 371 (c)(1),
(2) Date: Dec. 9, 2014

(87) PCT Pub. No.: WO2014/024670
PCT Pub. Date: Feb. 13, 2014

(65) Prior Publication Data

US 2015/0129378 A1 May 14, 2015

(30) Foreign Application Priority Data

Aug. 6, 2012 (JP) ................................ 2012-173812

(51) Int. Cl.
*F16F 9/53* (2006.01)

(52) U.S. Cl.
CPC .................................... *F16F 9/535* (2013.01)

(58) Field of Classification Search
CPC ....................................................... F16F 9/535
USPC ......... 188/267.2, 267, 267.1, 322.15, 322.22
See application file for complete search history.

(56) References Cited

U.S. PATENT DOCUMENTS 6,095,486 A 8/2000 Ivers et al.
6,158,470 A 12/2000 Ivers et al.
6,279,701 B1 * 8/2001 Namuduri ............... F16F 9/535 188/267.2
6,311,810 B1 * 11/2001 Hopkins ................ F16F 9/535 188/267.2
6,386,343 B1 * 5/2002 Robinson .............. F16F 9/3405 188/267
6,655,511 B1 * 12/2003 Lun ........................ F16F 9/535 188/267
6,874,603 B2 * 4/2005 Lisenker ................ F16F 9/535 188/267.2
7,051,849 B2 * 5/2006 Browne .................. F16F 9/535 188/266.4
7,753,180 B2 * 7/2010 Lun ........................ F16F 9/537 188/267
8,327,984 B2 * 12/2012 Foister .................... F16F 9/535 188/267
8,490,762 B2 * 7/2013 Lopez, Jr. .............. F16F 9/535 188/267.2
2004/0118646 A1 * 6/2004 Lun ........................ F16F 9/535 188/267
2004/0134728 A1 7/2004 Lisenker et al.
2009/0294231 A1 12/2009 Carlson et al.

FOREIGN PATENT DOCUMENTS

JP 2004-301271 A 10/2004
JP 2008-175369 A 7/2008
JP 2008-215487 A 9/2008
JP 2009-228861 A 10/2009

* cited by examiner

*Primary Examiner* — Thomas J Williams
*Assistant Examiner* — Mariano Sy
(74) *Attorney, Agent, or Firm* — Rabin & Berdo, P.C.

(57) ABSTRACT

A magnetorheological fluid damper using magnetorheological fluid, whose viscosity changes according to an intensity of a magnetizing field, as working fluid includes a cylinder in which magnetorheological fluid is sealed, a piston which is slidably arranged in the cylinder, a first fluid chamber and a second fluid chamber which are partitioned by the piston, a main flow passage which is open on opposite end surfaces of the piston and allows communication between the first and second fluid chambers, an electromagnetic coil which generates a magnetizing field to be applied to the magnetorheological fluid flowing in the main flow passage, a bypass flow passage which is formed at a position less affected by the magnetizing field generated by the electromagnetic coil than the main flow passage, and a bypass branching portion which branches the bypass flow passage from the main flow passage.

4 Claims, 3 Drawing Sheets

MAGNETORHEOLOGICAL FLUID DAMPER

TECHNICAL FIELD

The present invention relates to a magnetorheological fluid damper utilizing magnetorheological fluid whose viscosity changes by the action of a magnetizing field.

BACKGROUND ART

A magnetorheological fluid damper which changes a damping force by causing a magnetizing field to act on a flow passage in which magnetorheological fluid passes and changing an apparent viscosity of the magnetorheological fluid is known as a damper installed in a vehicle such as an automotive vehicle.

JP2009-228861A discloses a magnetorheological fluid damper which changes a damping force by an electromagnetic force of an electromagnetic coil.

This magnetorheological fluid damper includes first and second fluid chambers partitioned by a piston, a main flow passage (piston though passage) which is open on both ends of the piston and allows communication between the first and second fluid chambers, and a bypass flow passage which is open on the both ends of the piston and parallel with the main flow passage and allows communication between the first and second fluid chambers.

The main flow passage is so configured that a magnetizing field generated by an electromagnetic coil acts on magnetorheological fluid passing therein. By adjusting a current value of the electromagnetic coil, flow resistance of the magnetorheological fluid passing in the main flow passage is adjusted and a damping force generated by the magnetorheological fluid damper changes.

The bypass flow passage is so configured that the magnetorheological fluid passing therein is unlikely to be affected by the magnetizing field generated by the electromagnetic coil. A pressure fluctuation caused when the current value of the electromagnetic coil is adjusted is alleviated by flow resistance of the magnetorheological fluid passing in the bypass flow passage.

SUMMARY OF INVENTION

However, since the bypass flow passage is configured to penetrate through the piston and be open on the both ends of the piston in such a magnetorheological fluid damper, holes defining the bypass flow passage need to be formed in a plurality of members constituting the piston, which has led to a problem of complicating the structure of the piston.

Further, since it is necessary to adjust the position of each hole defining the bypass flow passage when the piston is assembled, there has been a problem that a piston assembling operation is difficult.

The present invention was developed in view of the above problems and aims to provide a magnetorheological fluid damper which is easily assembled and has a simple piston structure.

According to one aspect of the present invention, a magnetorheological fluid damper using magnetorheological fluid, whose viscosity changes according to an intensity of a magnetizing field, as working fluid includes a cylinder in which magnetorheological fluid is sealed, a piston which is slidably arranged in the cylinder, a first fluid chamber and a second fluid chamber which are partitioned by the piston, a main flow passage which is open on opposite end surfaces of the piston and allows communication between the first and second fluid chambers, an electromagnetic coil which generates a magnetizing field to be applied to the magnetorheological fluid flowing in the main flow passage, a bypass flow passage which is formed at a position less affected by the magnetizing field generated by the electromagnetic coil than the main flow passage, and a bypass branching portion which branches the bypass flow passage from the main flow passage.

DESCRIPTION OF EMBODIMENTS

Hereinafter, embodiments of the present invention are described with reference to the accompanying drawings.

First Embodiment

Figure 1:
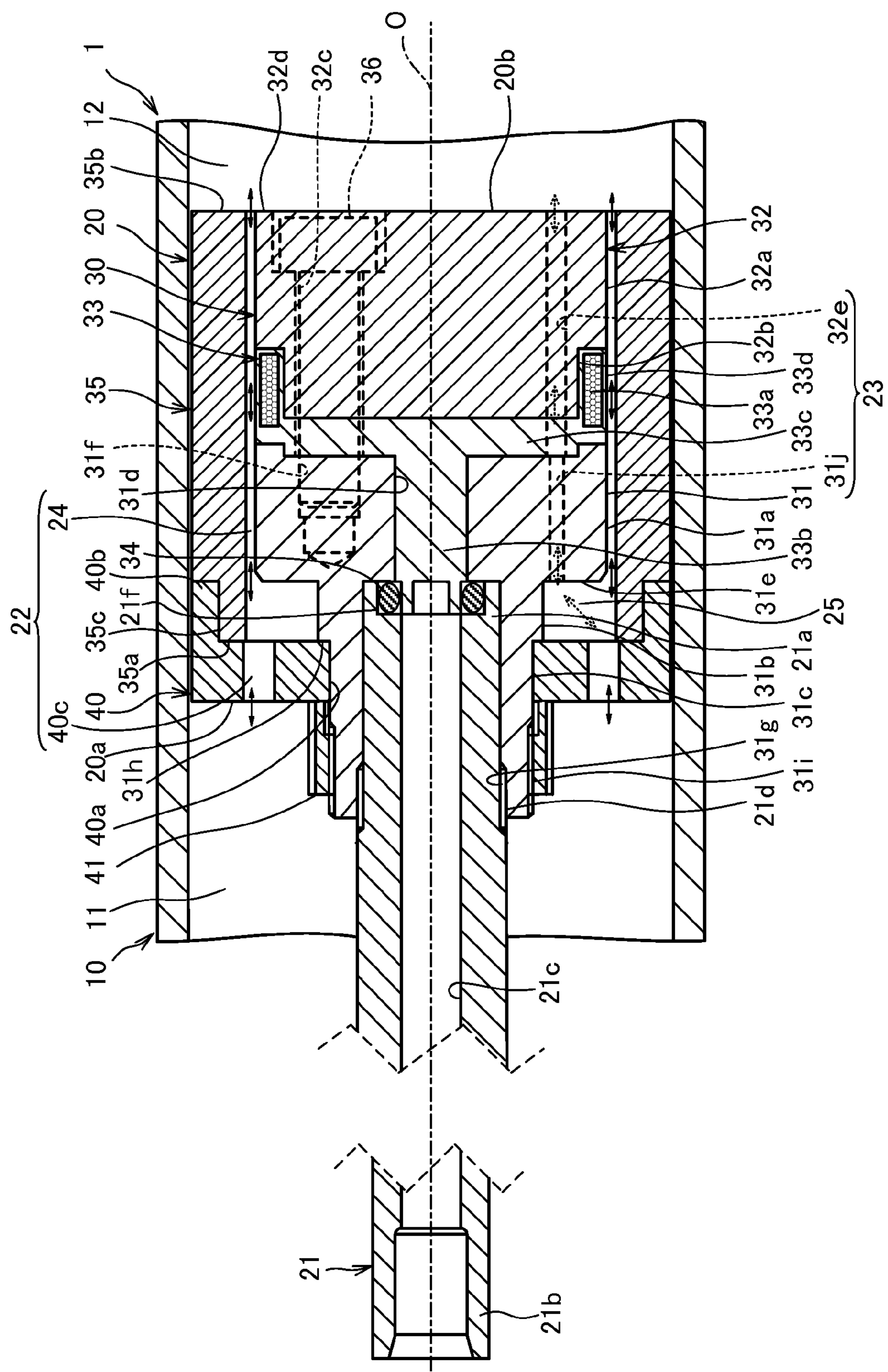
FIG. 1 is a front sectional view of a magnetorheological fluid damper according to a first embodiment of the present invention.

FIG. 1 is a sectional view showing a piston portion of a magnetorheological fluid damper (hereinafter, referred to merely as a "damper 1"). The damper 1 is interposed between a vehicle body and an axle in a vehicle such as an automotive vehicle and generates a damping force for suppressing vibration of the vehicle body by extending and contracting.

The damper 1 includes a hollow cylindrical cylinder 10 in which magnetorheological fluid is sealed as working fluid, a piston 20 which is slidably arranged in the cylinder 10 and partitions the interior of the cylinder 10 into first and second fluid chambers 11, 12, and a piston rod 21 which is coupled to the piston 20.

One end part 21_a_ of the piston rod 21 is coupled to the piston 20 and another end part 21_b_ thereof projects to the outside while being slidably inserted through a head portion (not shown) of the cylinder 10. The end part 21_b_ of the piston rod 21 is coupled to one of the vehicle body and the axle and the cylinder 10 is coupled to the other. This causes the damper 1 to extend and contract through relative movements of the piston rod 21 and the cylinder 10 in association with a movement of the axle relative to the vehicle body.

A gas chamber (not shown) filled with gas is defined via a free piston (not shown) in the cylinder 10, a volumetric change in the cylinder 10 caused by the entrance and exit of the piston rod 21 is compensate for by this gas chamber.

The damper 1 includes, as damping force generation elements, a main flow passage 22 which is open on both ends of the piston 20 and allows communication between the first and second fluid chambers 11, 12, an electromagnetic coil 33_a_ which generates a magnetizing field to be applied to the magnetorheological fluid flowing in the main flow passage 22, a bypass flow passage 23 which is formed at a position less affected by the magnetizing field generated by the electromagnetic coil 33_a_ than the main flow passage 22 and a bypass branching portion 25 which branches the bypass flow passage 23 from the main flow passage 22.

When the damper 1 extends and contracts, the piston 20 moves in an axial direction in the cylinder 10, whereby the magnetorheological fluid flows in the main flow passage 22 as shown by solid-line arrows in FIG. 1 and flows in the bypass flow passage 23 as shown by broken-line arrows in FIG. 1 to move between the first and second fluid chambers 11, 12 at opposite sides of the piston 20.

The magnetorheological fluid is such that ferromagnetic fine particles are dispersed in liquid such as oil and an apparent viscosity thereof changes according to an intensity of a magnetizing field.

As described later, the main flow passage 22 is so formed that the magnetorheological fluid flowing therein is affected by a magnetizing field (magnetic field) generated by the electromagnetic coil 33*a*. By adjusting a current value of the electromagnetic coil 33*a*, magnetic flux density crossing the main flow passage 22 changes to adjust flow resistance of the magnetorheological fluid flowing in the main flow passage 22 and change a damping force generated by the damper 1.

As described later, the bypass flow passage 23 is so formed that the magnetorheological fluid flowing therein is unlikely to be affected by the magnetizing field generated by the electromagnetic coil 33*a*. By flow resistance of the magnetorheological fluid passing in the bypass flow passage 23, a pressure fluctuation caused when the current value of the electromagnetic coil 33*a* is adjusted is alleviated.

A specific configuration of the piston 20 is described below.

The piston 20 includes a piston core 30 which is provided with the electromagnetic coil 33*a*, a flux ring 35 which surrounds the outer periphery of the piston core 30 and forms the main flow passage 22 between the outer periphery of the piston core 30 and the flux ring 35, and a piston plate 40 which couples the flux ring 35 to the piston core 30.

The piston core 30 includes a first core 31 which is attached to the end part 21*a* of the piston rod 21, a coil assembly 33 in an outer peripheral part of which the electromagnetic coil 33*a* is built, a second core 32 which sandwiches the coil assembly 33 between the first core 31 and the second core 32, and bolts 36 which are provided as fastening members for fastening the second core 32 to the first core 31.

The first core 31 is formed with hollow cylindrical large diameter portion 31*a*, intermediate diameter portion 31*b* and small diameter portion 31*c* which successively extend on the same axis, and a through hole 31*d* is formed to penetrate through the centers of these in the axial direction.

The small diameter portion 31*c* is formed into a hollow cylindrical shape projecting in the axial direction through the piston plate 40. An internal thread 31*g* to be threadably engaged with an external thread 21*d* of the piston rod 21 is formed on the inner periphery of the small diameter portion 31*c*. The first core 31 is fastened to the piston rod 21 by the threadable engagement of the external thread 21*d* and the internal thread 31*g*.

A radially extending annular step portion 31*h* is formed on a boundary part between the small diameter portion 31*c* and the intermediate diameter portion 31*b*. The piston plate 40 comes into contact with the step portion 31*h*. An external thread 31*i* to be threadably engaged with a nut 41 is formed on the outer periphery of the small diameter portion 31*c*. The piston plate 40 is sandwiched between the step portion 31*h* and the nut 41.

The second core 32 is so formed that solid cylindrical large diameter portion 32*a* and small diameter portion 32*b* successively extend on the same axis. The second core 32 is formed with two bolt holes 32*c* penetrating therethrough in the axial direction. The piston core 30 is assembled by interposing the coil assembly 33 between the first and second cores 31, 32, inserting two bolts 36 into the bolt holes 32*c* of the second core 32 and threadably engaging the bolts 36 with internal threads 31*f* of the first core 31.

The outer periphery of the small diameter portion 32*b* of the second core 32 is formed to have the same diameter as the inner periphery of a coil molding portion 33*d* of the coil assembly 33. The coil molding portion 33*d* is fitted to the small diameter portion 32*b* of the second core 32.

A molded resin body of the coil assembly 33 is formed by filling molding resin and curing this molding resin with the electromagnetic coil 33*a* and wiring (not shown) extending from the electromagnetic coil 33*a* set in a mold (not shown).

By forming the molded resin body of the coil assembly 33 provided with the electromagnetic coil 33*a* in this way and sandwiching it between the first core 31 and the second core 32, the piston core 30 can be easily formed as compared with the case where the piston core 30 is formed of a single body and a molding operation is performed.

The molded resin body includes a plug portion 33*b* to be inserted into the through hole 31*d* of the first core 31, a bridge portion 33*c* to be sandwiched between the first core 31 and the second core 32 and the coil molding portion 33*d* integrally provided with the electromagnetic coil 33*a*.

The tip of the plug portion 33*b* is fitted into an opening end part 21*f* of a shaft hole 21*c* of the piston rod 21. A terminal (not shown) for supplying a current to the electromagnetic coil 33*a* is provided on the tip of the plug portion 33*b*, and a pair of wires (not shown) passed through the shaft hole 21*c* of the piston rod 21 are connected to this terminal. These wires extend to the outside from a tip part (not shown) of the piston rod 21 and connected to a controller (not shown). This controller controls the amount of energization to the electromagnetic coil 33*a*, whereby the damping force generated by the damper 1 is adjusted.

It should be noted that, without being limited to the aforementioned configuration, one end of a wire material forming the electromagnetic coil 33*a* may be connected to the controller via wiring and the other end may be connected to the vehicle body via the first core 31 and the piston rod 21. In this case, a current supplied from the controller is supplied to the electromagnetic coil 33*a* via the wiring and the vehicle body.

An O-ring 34 is interposed between the opening end part 21*f* of the shaft hole 21*c* of the piston rod 21 and the tip of the plug portion 33*b*. The O-ring 34 is provided as a sealing member for sealing a connecting portion between the piston 20 and the piston rod 21. This prevents the magnetorheological fluid having intruded into between the outer periphery of the piston rod 21 and the first core 31 and between the first core 31 and the coil assembly 33 from leaking through the shaft hole 21*c* of the piston rod 21.

The flux ring 35 is formed into a hollow cylindrical shape centered on a center line O of the piston 20. The flux ring 35 is so fixed to the piston core 30 via the piston plate 40 as to be coaxial with the piston core 30. The piston plate 40 is for supporting one end part 35*a* of the flux ring 35 with respect to the piston core 30.

A small diameter portion 35*c* is formed on the end part 35*a* of the flux ring 35. The outer periphery of the small diameter portion 35*c* is formed to have a smaller diameter than the other part of the flux ring 35.

An annular jaw portion 40*b* is formed on the outer periphery of the piston plate 40. The small diameter portion 35*c* of the flux ring 35 is fitted to the jaw portion 40*b* and joined by brazing. It should be noted that, instead of brazing, the piston plate 40 and the flux ring 35 may be joined by welding, fastening or the like.

The outer periphery of the piston plate 40 is formed to have substantially the same diameter as the outer periphery of the flux ring 35. The outer periphery of the piston plate 40 and that of the flux ring 35 slid in contact with the inner periphery of the cylinder 10.

A through hole 40*a* into which the small diameter portion 31*c* of the first core 31 is fitted is formed on the inner periphery of the piston plate 40. The piston plate 40 is fixed to the first core 31 by fitting the small diameter portion 31*c* into the through hole 40*a*, thereby ensuring coaxiality between the piston plate 40 and the first core 31. It should be noted that, without being limited to the above configuration, the piston plate 40 may be fitted on the outer periphery of the piston rod 21 to fix the position of the piston plate 40 with respect to the first core 31.

The configurations of the main flow passage 22 and the bypass flow passage 23, in which the magnetorheological fluid flows, in the piston 20 are described below.

The main flow passage 22 is formed by an annular main clearance 24 defined between the piston core 30 and the flux ring 35 and a plurality of main holes (through holes) 40*c* formed in the piston plate 40. The main flow passage 22 penetrates through the piston 20, and both ends thereof are open on opposite end surfaces 20*a*, 20*b* of the piston 20 to allow communication between the first and second fluid chambers 11, 12. When the damper 1 extends and contracts, the magnetorheological fluid flows in the main flow passage 22 as shown by solid line arrows in FIG. 1.

The outer periphery of the large diameter portion 31*a* of the first core 31 is formed into a hollow cylindrical surface centered on the center line O of the piston 20. The main clearance 24 is defined as an annular space between the outer periphery of the large diameter portion 31*a* and the inner periphery of the flux ring 35.

The first and second cores 31, 32 of the piston core 30 and the flux ring 35 are formed of a magnetic material and form a magnetic path for guiding magnetic fluxes generated around the electromagnetic coil 33*a*. On the other hand, the piston plate 40 is formed of a nonmagnetic material. Thus, the main clearance 24 provided between the piston core 30 and the flux ring 35 serves as a magnetic gap through which magnetic fluxes generated around the electromagnetic coil 33*a* pass. This causes a magnetizing field of the electromagnetic coil 33*a* to act on the magnetorheological fluid flowing in the main clearance 24 when the damper 1 extends and contracts.

The bypass flow passage 23 is formed by a first bypass hole (through hole) 31*j* formed in the first core 31 of the piston core 30 and a second bypass hole (through hole) 32*e* formed in the second core 32. The annular bypass branching portion 25 is defined between the piston core 30 and the piston plate 40. One end of the bypass flow passage 23 is branched off from the main flow passage 22 via the bypass branching portion 25 and the other end thereof is open on the end surface 20*b* of the piston 20 to allow communication between the first and second fluid chambers 11, 12. When the damper 1 extends and contracts, the magnetorheological fluid flows in the bypass flow passage 23 as shown by broken line arrows in FIG. 1.

Since the electromagnetic coil 33*a* is built in the outer peripheral part of the piston core 30 and the bypass flow passage 23 is defined by the first and second bypass holes 31*j*, 32*e* penetrating in the axial direction through the piston core 30 made of the magnetic material, the magnetorheological fluid flowing in the bypass flow passage 23 is unlikely to be affected by the magnetizing field generated by the electromagnetic coil 33*a*.

A radially extending step portion 31*e* is formed on a boundary part between the intermediate diameter portion 31*b* and the large diameter portion 31*a* of the first core 31. The bypass branching portion 25 is defined as an annular space between the step portion 31*e* and the piston plate 40 on the outer periphery of the intermediate diameter portion 31*b*. An outer peripheral part of the bypass branching portion 25 is connected to the main flow passage 22.

The first core 31 is formed with the first bypass hole 31*j* penetrating through the large diameter portion 31*a*. One end of the first bypass hole 31*j* is open on the step portion 31*e*. Since the first core 31 is formed with the step portion 31*e*, it is possible to form the first bypass hole 31*j* open on the step portion 31*e* and extending in the axial direction by drilling. It should be noted that, without being limited to the annular configuration as described above, the step portion 31*e* may be formed at a limited position where the first bypass hole 31*j* is open.

The second core 32 is formed with the second bypass hole 32*e* penetrating therethrough. This second bypass hole 32*e* is formed on the same axis as the first bypass hole 31*j* and connected to the first bypass hole 31*j*.

An opening diameter of the second bypass hole 32*e* is larger than that of the first bypass hole 31*j*. This prevents a flow passage area defined by the connecting portion of the first and second bypass holes 32*j*, 32*e* from being lost even if the positions of the first and second bypass holes 32*j*, 32*e* are slightly misaligned when the first and second cores 31, 32 are assembled.

Figure 2:
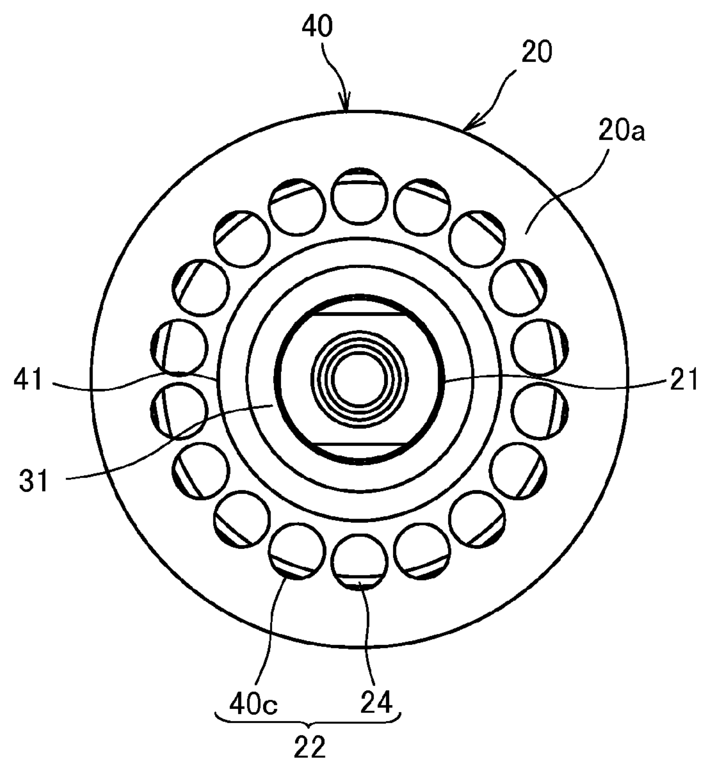
FIG. 2 is a left side view of a piston in FIG. 1.

As shown in FIG. 2, the end surface 20*a* of the piston 20 is formed by the end surface of the piston plate 40. The piston plate 40 is formed with the plurality of main holes 40*c* arranged at equal intervals on a circumference centered on the center line O of the piston 20. Opening ends of the main holes 40*c* form an opening of the main flow passage 22 for the first fluid chamber 11. The main holes 40*c* are formed to have a circular opening cross-section. Without being limited to this, the main holes 40*c* may be formed to have an elliptical opening cross-section, for example.

Figure 3:
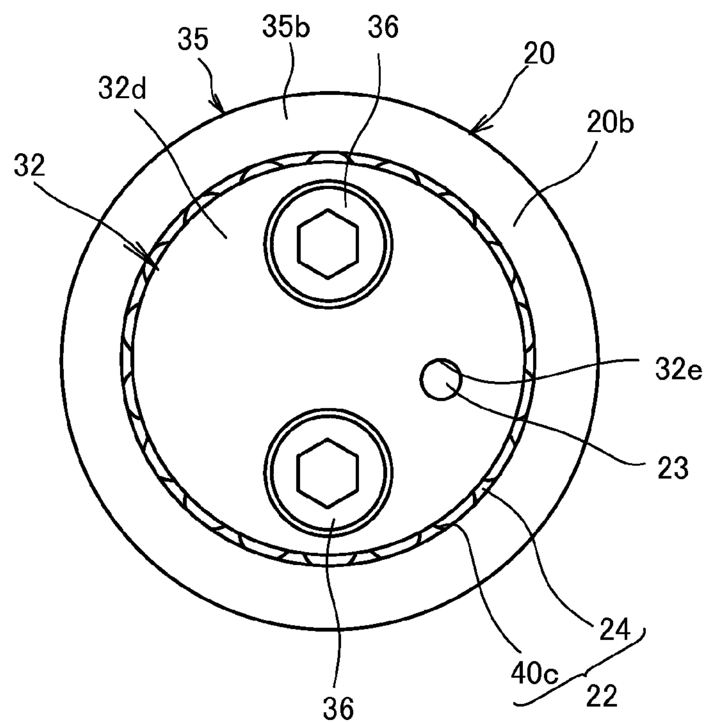
FIG. 3 is a right side view of the piston in FIG. 1.

As shown in FIG. 3, the end surface 20*b* of the piston 20 is formed by an end surface 35*b* of the flux ring 35 and an end surface 32*d* of the second core 32. In the end surface 20*b* of the piston 20, an annular opening of the main flow passage 22 for the second fluid chamber 12 is defined between the inner periphery of the flux ring 35 and the outer periphery of the second core 32. In the end surface 32*d* of the second core 32, the second bypass hole 32*e* is open and an opening end of the second bypass hole 32*e* forms an opening of the bypass flow passage 23 for the second fluid chamber 12.

The damping force generated by the damper 1 is adjusted by changing the amount of energization to the electromagnetic coil 33*a* to change the intensity of the magnetizing field acting on the magnetorheological fluid flowing in the main flow passage 22. As the current supplied to the electromagnetic coil 33*a* increases, the intensity of the magnetizing field generated around the electromagnetic coil 33*a* increases, the viscosity of the magnetorheological fluid flowing in the main flow passage 22 increases and the damping force generated by the damper 1 increases.

When the damper 1 extends and contracts, a pressure fluctuation caused when the current value of the electromagnetic coil 33*a* is adjusted is alleviated by flow resistance of the bypass flow passage 23, whereby the occurrence of an impact, noise and the like due to a sudden pressure fluctuation is prevented. In the damper 1, the opening diameters, lengths and the like of the first and second bypass holes 31*j*, 32*e* of the bypass flow passage 23 are set according to a damping characteristic required for a product.

It should be noted that the bypass flow passage 23 may be configured by a plurality of pairs of the first and second bypass holes 31*j*, 32*e* arranged in parallel in the piston core 30 without being limited to the configuration including a pair of the first and second bypass holes 31*j*, 32*e* arranged as described above.

As described above, the damper 1 includes the main flow passage 22 that is open on the both end surfaces 20*a*, 20*b* of the piston 20 and allows communication between the first and second fluid chambers 11, 12, the electromagnetic coil 33*a* that generates a magnetizing field to be applied to the magnetorheological fluid flowing in the main flow passage 22, the bypass flow passage 23 that is formed at the position less likely to be affected by the magnetizing field generated by the electromagnetic coil 33*a* than the main flow passage 22, and the bypass branching portion 25 that branches the bypass flow passage 23 from the main flow passage 22.

Since the bypass branching portion 25 for branching the bypass flow passage 23 from the main flow passage 22 is provided in the piston 20, one end of the piston 20 only has to be formed with the main holes 40*c* forming the main flow passage 22 and is easily processed. Further, since the end part of the piston 20 needs not be formed with a hole for allowing communication between the first and second fluid chambers 11, 12 and the bypass flow passage 23, it is not necessary to align the positions of the hole formed in the end part of the piston 20 and the bypass flow passage 23, thereby facilitating assembling.

The piston 20 includes the piston core 30 formed with the bypass flow passage 23, the flux ring 35 provided on the outer periphery of the piston core 30 and forming the main flow passage 22 between the piston core 30 and the flux ring 35, and the piston plate 40 fixed to the piston core 30 and supporting the end part 35*a* of the flux ring 35, and the bypass branching portion 25 is defined between the step portion 31*e* formed on the piston core 30 and the piston plate 40.

By the above configuration, a sufficient flow passage area of the bypass branching portion 25 for connecting the bypass flow passage 23 to the main flow passage 22 is ensured and the magnetorheological fluid smoothly flows in the bypass branching portion 25. Since the bypass branching portion 25 is provided at a distance from the electromagnetic coil 33*a*, the magnetorheological fluid is unlikely to be affected by the magnetizing field generated by the electromagnetic coil 33*a*. This suppresses flow resistance of the bypass branching portion 25 to a low level and an obtained damping characteristic is not impaired by flow resistance in the main flow passage 22 and the bypass flow passage 23. Further, in forming the first core 31 of the piston core 30 by casting, the step portion 31*e* can be formed by a mold for forming the first core 31. In this way, the number of processing steps for the piston core 30 needs not be increased in forming the bypass branching portion 25 and a cost increase of a product can be suppressed.

It should be noted that, without being limited to the above configuration, a through hole or a recess may be, for example, formed at another position of the piston core 30 by cutting and a bypass branching portion for connecting the first bypass hole 31*j* to the main flow passage 22 may be defined by this hole or recess.

Since the first bypass hole 31*j* defining the bypass flow passage 23 is open on the step portion 31*e* defining the bypass branching portion 25 and the bypass branching portion 25 forms a flow passage allowing communication between the first bypass hole 31*j* and the main holes 40*c* open on the piston plate 40, it is suppressed to bend a flowing direction of the magnetorheological fluid from the first bypass hole 31*j* to the main holes 40*c* through the bypass branching portion 25 and the magnetorheological fluid smoothly flows through the bypass branching portion 25.

The damper 1 includes the piston plate 40 coupled to the piston core 30 and facing the first fluid chamber 11, the one end part 35*a* of the flux ring 35 is supported by the piston plate 40, one end of the bypass flow passage 23 is branched off from the main flow passage 22, and the other end of the bypass flow passage 23 is open on the end surface 32*d* of the piston core 30 facing the second fluid chamber 12. The piston plate 40 is provided on one end of the flux ring 35, and the one end of the bypass flow passage 23 is open on the bypass branching portion 25 and the other end thereof is open to the second fluid chamber 12. It should be noted that, without being limited to this, the other end of the bypass flow passage 23 may be open to the first fluid chamber 11.

By the above configuration, the number of components constituting the piston 20 is reduced and the piston 20 can be made smaller as compared with a structure for sandwiching both ends of a piston core by two piston plates (see FIG. 4) to be described later.

Second Embodiment

Figure 4:
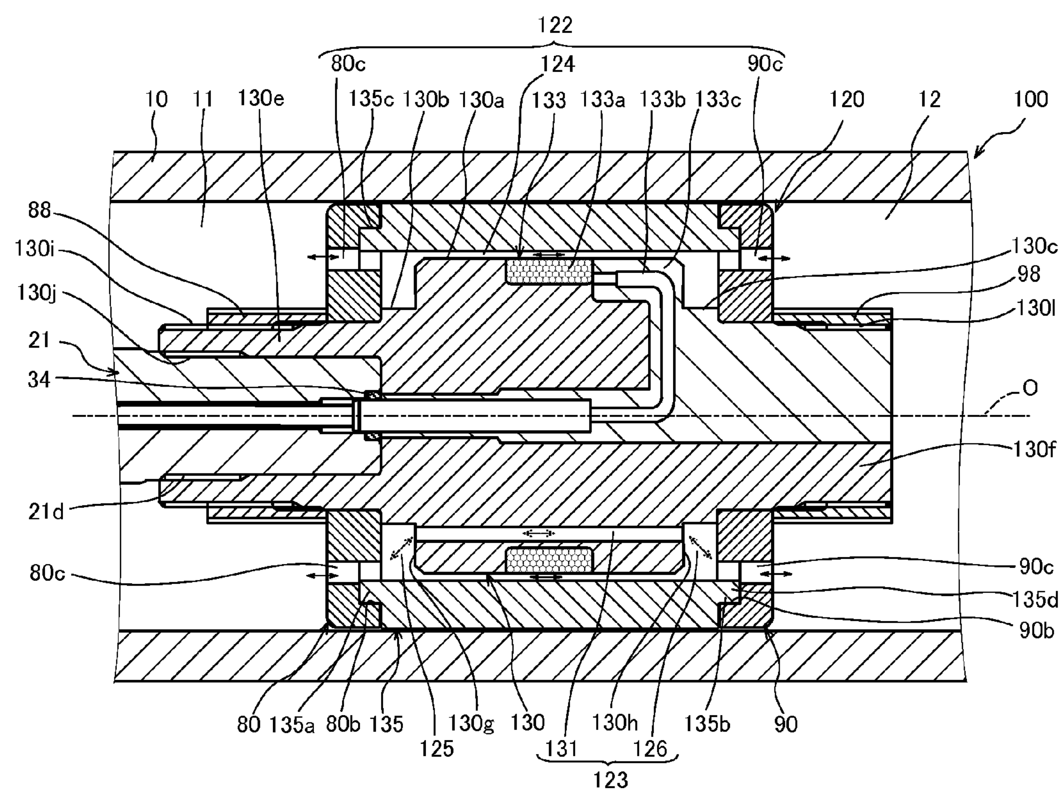
FIG. 4 is a front sectional view of a magnetorheological fluid damper according to a second embodiment of the present invention.

Next, a magnetorheological fluid damper (hereinafter, referred to merely as a "damper 100") according to a second embodiment of the present invention is described with reference to FIG. 4. The following description is centered on points of difference from the first embodiment and the same components as the damper 1 of the first embodiment are denoted by the same reference signs and not described.

In the damper 1 according to the first embodiment, the one end part 35*a* of the flux ring 35 is supported by the piston plate 40. In the damper 100 according to the second embodiment, a configuration in which both end parts 135*a*, 135*b* of a flux ring 135 are supported between a piston plate 80 and a piston plate 90 differs from the first embodiment.

A piston 120 includes a piston core 130 to which a piston rod 21 is coupled, the hollow cylindrical flux ring 135 for defining an annular main clearance 124 on the outer periphery of the piston core 130, and the piston plates 80 and 90 for supporting the flux ring 135.

The piston core 130 includes solid cylindrical small diameter portions 130*e*, 130*f* projecting from both ends. An internal thread 130*j* to be threadably engaged with an external thread 21*d* of the piston rod 21 is formed on the inner periphery of one small diameter portion 130*e*. The piston rod 21 and the piston core 130 are fastened by the threadable engagement of the external thread 21*d* and the internal thread 130*j*.

The piston core 130 is formed with external threads 130*i*, 130*l* respectively formed on the outer peripheries of the small diameter portions 130*e*, 130*f*. The piston plate 80 is fastened to the piston core 130 by a nut 88 to be threadably engaged with the external thread 130*i*, and the piston plate 90 is fastened to the piston core 130 by a nut 98 to be threadably engaged with the external thread 130*l*.

The both end parts 135*a*, 135*b* of the flux ring 135 are supported on the piston core 130 via the piston plates 80, 90. Hollow cylindrical small diameter portions 135*c*, 135*d* are formed on the both end parts 135*a*, 135*b* of the flux ring 135. Annular jaw portions 80*b*, 90*b* to be respectively fitted to the small diameter portions 135*c*, 135*d* are respectively formed on the outer peripheries of the piston plates 80, 90. The flux ring 135 is sandwiched between the piston plates 80, 90.

A coil assembly 133 is disposed in the piston core 130. The coil assembly 133 includes an electromagnetic coil 133*a*, a wire 133*b* extending from the electromagnetic coil 133*a* and a molded resin body 133*c* surrounding these.

The configurations of a main flow passage 122 and a bypass flow passage 123, in which the magnetorheological fluid flows, in the piston 120 are described below.

The main flow passage 122 is formed by an annular main clearance 124 defined between the piston core 130 and the flux ring 135 and a plurality of main holes 80*c*, 90*c* respectively formed in the piston plates 80, 90. The main flow passage 122 penetrates through the piston 120, and both ends thereof are open on opposite end surfaces 20*a*, 20*b* of the piston 120 to allow communication between the first and second fluid chambers 11, 12 at opposite sides of the piston 120. When the damper 100 extends and contracts, the piston 120 moves in the axial direction in a cylinder 10, whereby the magnetorheological fluid flows in the main flow passage 22 as shown by solid line arrows in FIG. 4.

The bypass flow passage 123 is formed by annular bypass branching portions 125, 126 respectively defined between the piston core 130 and the piston plate 80 and between the piston core 130 and the piston plate 90, and a bypass hole (through hole) 131 formed in the piston core 130. Both ends of the bypass flow passage 123 are branched off from the main flow passage 122 via the bypass branching portions 125, 126 to allow communication between the first and second fluid chambers 11, 12. When the damper 100 extends and contracts to slide the piston 120 in the axial direction in the cylinder 10, the magnetorheological fluid flows in the bypass flow passage 123 as shown by broken line arrows in FIG. 4.

The piston core 130 is formed with hollow cylindrical large diameter portion 130*a*, intermediate diameter portions 130*b*, 130*c* and small diameter portions 130*e*, 130*f* which successively extend on the same axis.

The outer periphery of the large diameter portion 130*a* is formed into a hollow cylindrical surface centered on a center line O of the piston 120. The main clearance 124 is defined as an annular space between the outer periphery of the large diameter portion 130*a* and the inner periphery of the flux ring 135.

Annular step portions 130*g*, 130*h* are formed on the outer peripheries of end parts of the intermediate diameter portions 130*b*, 130*c* connected to the large diameter portion 130*a*. On the outer peripheries of the intermediate diameter portions 130*b*, 130*c*, the bypass branching portions 125, 126 are respectively defined as annular spaces between the step portions 130*g*, 130*h* and the piston plates 80, 90. Outer peripheral parts of the bypass branching portions 125, 126 are connected to the main flow passage 122.

The piston core 130 is formed with the bypass hole 131 penetrating in the axial direction through the large diameter portion 130*a*. Both ends of the bypass hole 131 are respectively open on the step portions 130*g*, 130*h*.

The piston plate 80 is formed with a plurality of main holes (through holes) 80*c* and opening ends of the main holes 80*c* form an opening of the main flow passage 122 for the first fluid chamber 11. The piston plate 90 is formed with a plurality of main holes (through holes) 90*c* and opening ends of the main holes 90*c* form an opening of the main flow passage 122 for the second fluid chamber 12.

The piston core 130 and the flux ring 135 are formed of a magnetic material and form a magnetic path for guiding magnetic fluxes generated around the electromagnetic coil 133*a*. On the other hand, the piston plates 80, 90 are formed of a nonmagnetic material. Thus, the main clearance 124 provided between the piston core 130 and the flux ring 135 serves as a magnetic gap through which magnetic fluxes generated around the electromagnetic coil 133*a* pass. This causes a magnetizing field of the electromagnetic coil 133*a* to act on the magnetorheological fluid flowing in the main clearance 124 when the damper 100 extends and contracts.

A damping force generated by the damper 100 is adjusted by changing the amount of energization to the electromagnetic coil 133*a* to change an intensity of the magnetizing field acting on the magnetorheological fluid flowing in the main flow passage 122.

Since the electromagnetic coil 133*a* is provided on the outer periphery of the piston core 130 and the bypass flow passage 123 is defined by the bypass hole 131 penetrating in the axial direction through the piston core 130 made of the magnetic material, the magnetorheological fluid flowing in the bypass flow passage 123 is unlikely to be affected by the magnetizing field generated by the electromagnetic coil 133*a*.

In the damper 100, a pressure fluctuation caused when a current value of the electromagnetic coil 133*a* is adjusted is alleviated by flow resistance of the bypass flow passage 123, whereby the occurrence of an impact, noise and the like due to a sudden pressure fluctuation is prevented. In the damper 100, the opening diameters, lengths and the like of the bypass hole 131 of the bypass flow passage 123 are set according to a damping characteristic required for a product.

It should be noted that, the bypass flow passage 123 is not limited to the configuration of arranging the single bypass hole 131 as described above, and a plurality of bypass holes 131 may be arranged in parallel in the piston core 130.

As described above, the damper 100 includes two piston plates 80, 90 to be coupled to the piston core 130, the opposite end parts 135*a*, 135*b* of the flux ring 135 are supported between the piston plates 80, 90, and the both ends of the bypass flow passage 123 are branched off from the main flow passage 122. The piston plates 80, 90 are provided on the both ends of the flux ring 135 and the both ends of the bypass flow passage 123 are open to the main flow passage.

By the above configuration, stiffness for supporting the flux ring 135 on the piston core 130 is increased, the piston plates 80, 90 need not be provided with through holes for defining the bypass flow passages 123, and the structure of the piston 120 can be simplified.

Embodiments of this invention were described above, but the above embodiments are merely examples of applications of this invention, and the technical scope of this invention is not limited to the specific constitutions of the above embodiments.

With respect to the above description, the contents of application No. 2012-173812, with a filing date of Aug. 6, 2012 in Japan, are incorporated herein by reference.

The invention claimed is:

1. A magnetorheological fluid damper using magnetorheological fluid, whose viscosity changes according to an intensity of a magnetizing field, as working fluid, comprising:

a cylinder in which the magnetorheological fluid is sealed;

a piston which is slidably arranged in the cylinder;

a first fluid chamber and a second fluid chamber which are partitioned by the piston;

a main flow passage which is open on opposite end surfaces of the piston and allows communication between the first and second fluid chambers;

an electromagnetic coil which generates a magnetizing field to be applied to a portion of the magnetorheological fluid which is flowing in the main flow passage;

a bypass flow passage which is formed at a position less affected by the magnetizing field generated by the electromagnetic coil than a position of the main flow passage; and a bypass branching portion which branches the bypass flow passage from the main flow passage, the piston including:

a piston core, the bypass flow passage being disposed in the piston core; and a piston plate which defines the bypass branching portion as an annular space between the piston core and the piston plate.

2. The magnetorheological fluid damper according to claim 1, wherein:

the piston includes a flux ring which is provided on an outer periphery of the piston core and forms the main flow passage between the piston core and the flux ring;

the piston plate is fixed to the piston core and supports an end part of the flux ring; and the bypass branching portion is defined between a step portion formed on the piston core and the piston plate.

3. The magnetorheological fluid damper according to claim 2, wherein:

the piston plate is provided on one end of the flux ring;

one end of the bypass flow passage is open on the bypass branching portion; and another end of the bypass flow passage is open to either one of the first and second fluid chambers.

4. The magnetorheological fluid damper according to claim 2, wherein:

the piston plate is provided on two opposite ends of the flux ring; and two opposite ends of the bypass flow passage are open to the main flow passage.

* * * * *